Figure 1:
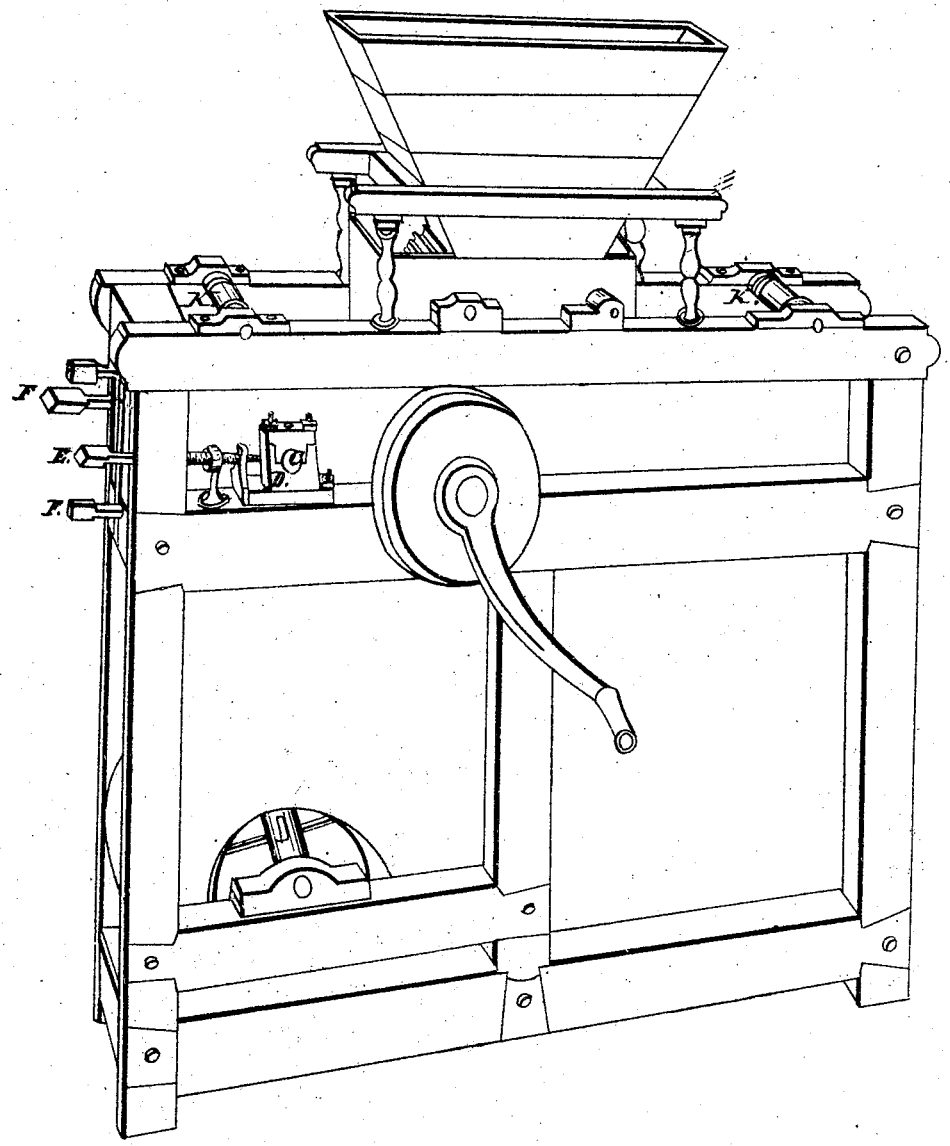
Figure 2:
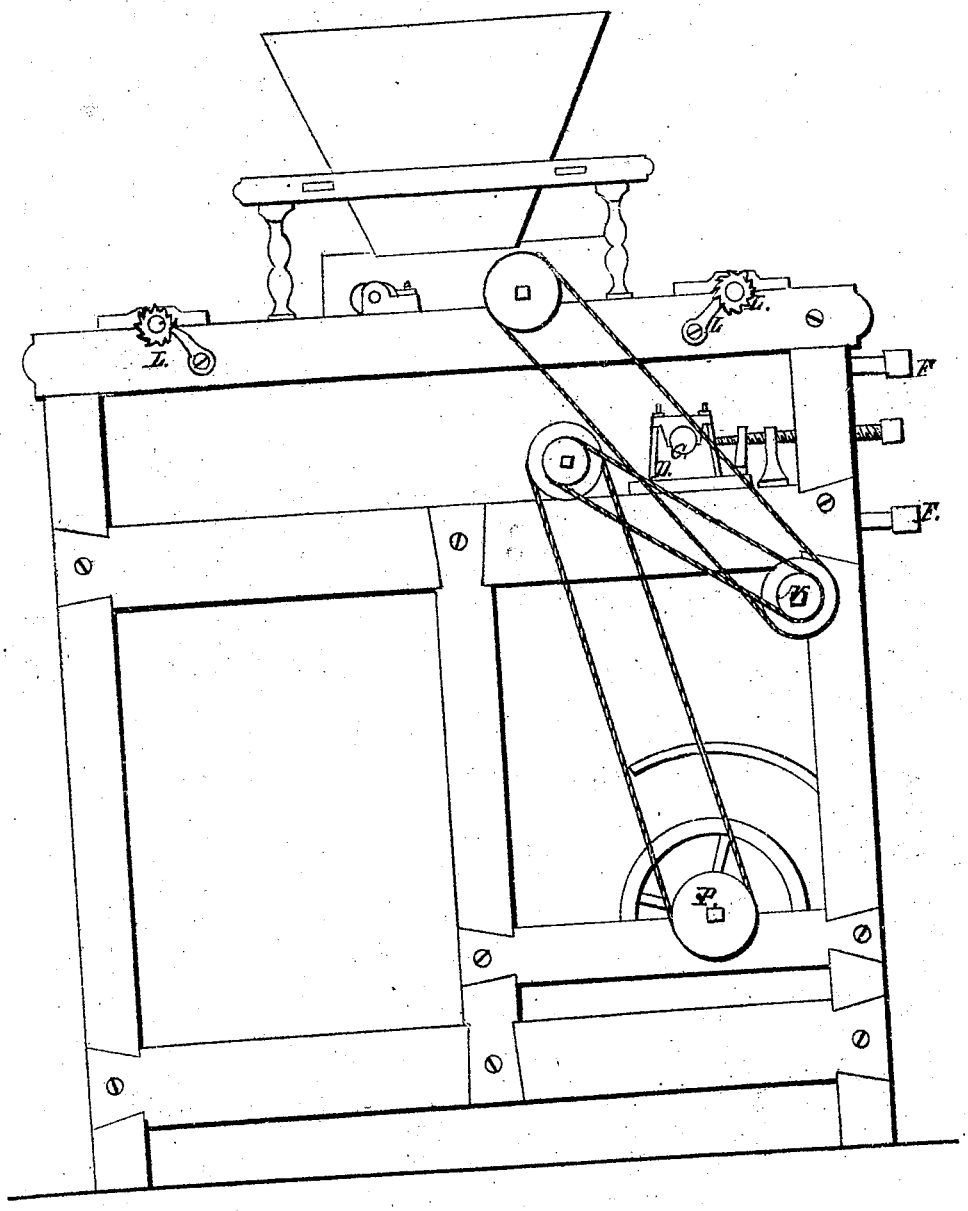
Figure 4:
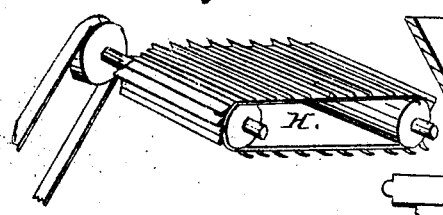
Figure 3:
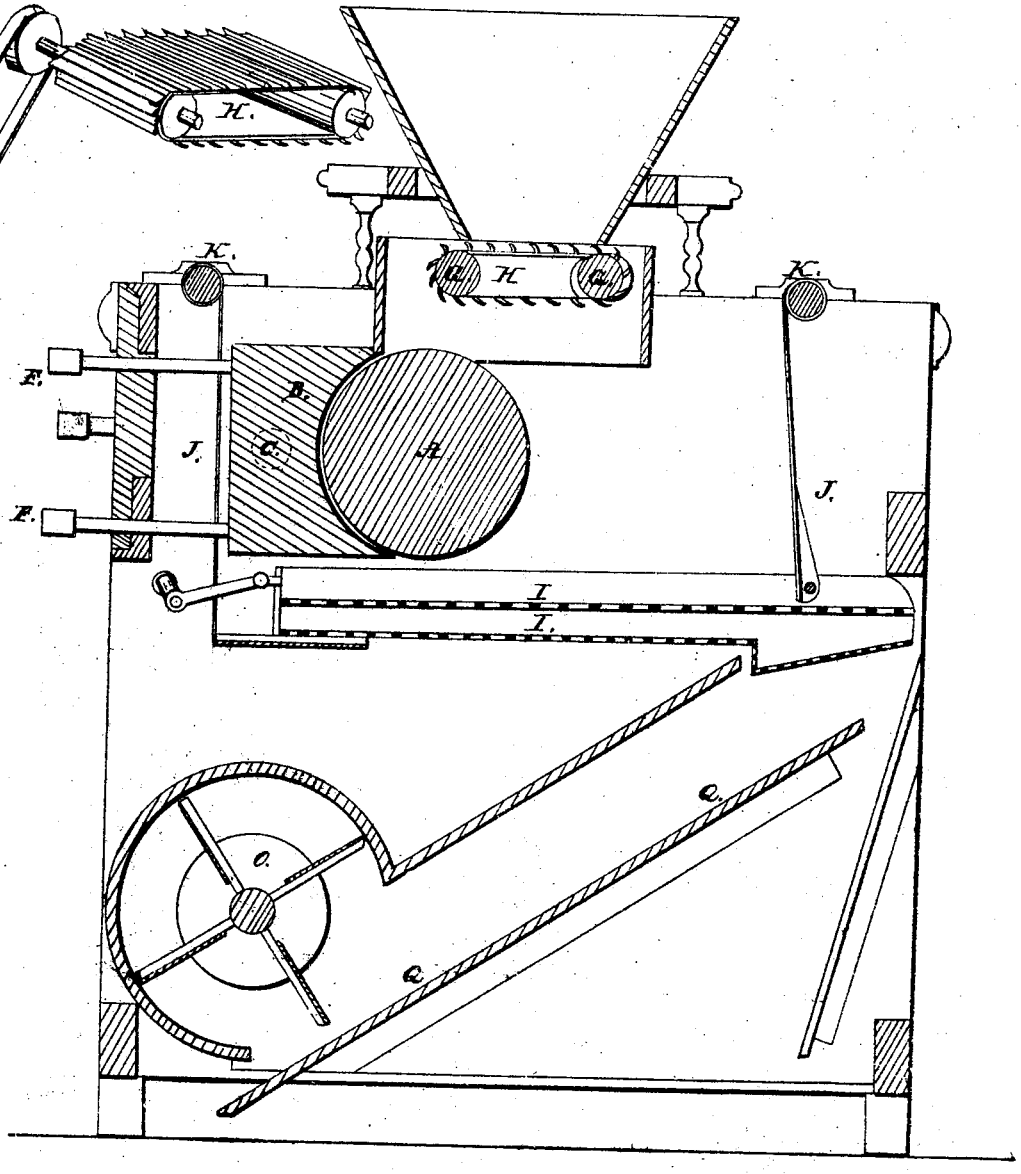

5755X

F. Follet.

Sheet 1.
3 Sheets.

Cotton Seed Huller.

Patented Dec. 15, 1829.

5755X

Sheet 2
3 Sheets.

F. Follet.

Cotton Seed Huller.

Patented Dec. 15, 1829.

5755X

F. Follet.

Sheet 3, 3 Sheets

Cotton Seed Huller.

Patented Dec. 15, 1829.

United States Patent Office

PTO - BOYERS, PA Duty Station

MISSING PAGE TEMPORARY NOTICE

PATENT # 5755X FOR ISSUE DATE 12-15-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text

Data Conversion Operation

Boyers, Pa